United States Patent
Yamanouchi

(10) Patent No.: US 8,189,216 B2
(45) Date of Patent: May 29, 2012

(54) PRINTING SYSTEM AND PRINTER

(75) Inventor: Katsuyoshi Yamanouchi, Fukushima (JP)

(73) Assignee: Oki Data Corporation, Tokyo (JP)

( * ) Notice: Subject to any disclaimer, the term of this patent is extended or adjusted under 35 U.S.C. 154(b) by 376 days.

(21) Appl. No.: 12/453,365

(22) Filed: May 8, 2009

(65) Prior Publication Data

US 2009/0296137 A1  Dec. 3, 2009

(30) Foreign Application Priority Data

Jun. 3, 2008  (JP) ................. 2008-146100

(51) Int. Cl.
  *G06F 3/12* (2006.01)
  *B41J 29/00* (2006.01)
  *B41J 29/28* (2006.01)
(52) U.S. Cl. ............ 358/1.14; 358/3.28; 358/1.15
(58) Field of Classification Search ............... 358/1.1, 358/1.13–1.18, 1.9, 3.26, 3.28; 347/5, 6, 347/9–17

See application file for complete search history.

(56) References Cited

U.S. PATENT DOCUMENTS

| 6,548,768 B1 | 4/2003 | Pettersson et al. |
| 2007/0188817 A1* | 8/2007 | Noguchi ............ 358/3.28 |

FOREIGN PATENT DOCUMENTS

| JP | 08-152988 A | 6/1996 |
| JP | 2003-186642 A | 7/2003 |
| JP | 2006-141064 | 6/2006 |
| JP | 2007-148644 A | 6/2007 |

* cited by examiner

*Primary Examiner* — James A Thompson
(74) *Attorney, Agent, or Firm* — Rabin & Berdo, P.C.

(57) ABSTRACT

A printing system includes a printer in which particular information is set to designate the printer is a qualified printer, and a host device for transmitting print information created by a particular application to the printer. The particular application has an information adding unit that adds information to the print information. The printer has a decision unit that decides whether the information added to the print information matches the particular information stored in the printer, and a print processing unit that prints the print information only if this is the case. This arrangement enables qualified electronic form data to be printed only by a qualified printer, and a qualified printer to print only qualified electronic form data, without requiring significant modifications of existing printer programs or electronic form data specifications.

6 Claims, 10 Drawing Sheets

FIG.2

```
%-12345X@PJL RESOURCEWRITE LOCATION="PsGeneralAccess DriverProc" SIZE=80390 DISPLAY="DOWNLOAD PS DriverProc"
%!PS-Adobe-3.0
    ...(LINES OMITTED)...
(1) /C5900_ANOTO { true } executeonly def          %% Declaration of Anoto-qualified printer
    ...(LINES OMITTED)...
(2) userdict begin                                 %% Definition to prevent printing of unqualified
    /definefont {                                      Anoto electronic form data
        exch dup 3 1 roll /AnotoFont eq
        {
            currentuserparams /JobName get (_C5900_ANOTO) ne
            { userdict begin /showpage { erasepage } bind def end
            } {
            } ifelse
        } if
        //definefont
    } bind def
    end
    ...(LINES OMITTED)...
%% end definition
currentdict end
/DriverOps exch /ProcSet defineresource pop
} {pop pop (Failed) print flush} ifelse
%%EndResource
%-12345X
```

```
%!PS-Adobe-3.0
(3) <</JobName (_C5900_ANOTO) >>setserparams          %% Declaration of qualified Anoto
                                                          electronic form data
(4) /DriverOps /ProcSet findresource /C5900_ANOTO 2 copy known   %% Definition to prevent printing
    { get exec not                                                   by unqualified printer
      { userdict begin /showpage {//erasepage} bind def end } if
    }{
      pop pop / showpage {//erasepage} bind def
    } ifelse
    ...(LINES OMITTED)...
(5) /AnotoFont exch definefont pop                    %% Definition of Anoto dot pattern (font)
    ...(LINES OMITTED)...
    showpage
    %%EOF
```

```
%-12345X@PJL RESOURCEWRITE LOCATION="PsGeneralAccess DriverProc" SIZE=80390 DISPLAY="DOWNLOAD PS DriverProc"
%!PS-Adobe-3.0
...(LINES OMITTED)...
(1) /C5900_ANOTO { true } executeonly def           %% Declaration of Anoto-qualified printer
    ...(LINES OMITTED)...
(2) userdict begin                                  %% Definition to prevent printing of unqualified
    /definefont {                                        Anoto electronic form data
      exch dup 3 1 roll /AnotoFont eq
      {
        currentuserparams /JobName get (_C5900_ANOTO) ne
        { userdict begin /showpage { undefined-operator } bind def end    %% Replace with undefined
        } {                                                                  operator to force error
        } ifelse
      } if
      //definefont
    } bind def
    end
...(LINES OMITTED)...
%% end definition
currentdict end
/DriverOps exch /ProcSet defineresource pop
} {pop pop (Failed) print flush} ifelse
%%EndResource
%-12345X
```

```
    %! Adobe-PS
(3) «/JobName (_C5900_ANOTO) » setserparams            %% Declaration of qualified Anoto electronic form data
(4)' /DriverOps /ProcSet findresource /C5900_ANOTO 2 copy known    %% Definition to prevent printing by unqualified priter
    { get exec not
      { userdict begin / showpage {undefined-operator} bind def end } if     %% Replace with undefined operator to force error
      { 
        pop pop / showpage {undefined-operator} bind def                     %% Replace with undefined operator to force error
      } ifelse
    ...(LINES OMITTED)...
(5) /AnotoFont exch definefont pop                      %% Definition of Anoto dot pattern (font)
    ...(LINES OMITTED)...
    showpage
    %%EOF
```

30'

PRINTING SYSTEM AND PRINTER

BACKGROUND OF THE INVENTION

1. Field of the Invention

The present invention relates to a printing system and printer that enable particular data created by a particular type of application program to be printed by a particular type of printer while preventing particular data created by other application programs from being printed by the particular type of printer and preventing particular data created by the particular type of application program from being printed by other types of printers.

2. Description of the Related Art

Digital pens that digitize handwritten information entered on printed media such as application forms and medical records are commercially available. A special pen developed by Anoto AB in Sweden, for example, has a miniature camera mounted near its tip that detects a proprietary dot pattern printed on a sheet of paper, thereby tracing the movement of the pen as it writes text or diagrams or makes marks. The trace data are stored in the pen and transmitted to an appropriate information processing apparatus, which converts the written information to a useful form in an electronic file or database, as disclosed in U.S. Pat. No. 6,548,768 to Pettersson et al.

Tools such as the Anoto Form Design Tool, which functions within the Adobe Acrobat software system, are used to incorporate the proprietary dot pattern into print data. Anoto Form Design Tool reads original document data from a file in a portable document format (PDF), adds the dot pattern, and generates a PostScript file as Anoto electronic form data. The PostScript file is then sent to a printer with an Anoto-qualified PostScript interpreter, which prints the PostScript file to create a paper form that can be used with an Anoto digital pen.

The Anoto electronic form data generated by the Anoto Form Design Tool, however, constitute an ordinary PostScript file, which will be printed out automatically even by a printer having a PostScript interpreter that is not Anoto-qualified. In many cases, the result is a printed form that cannot be recognized by the digital pen.

SUMMARY OF THE INVENTION

An object of the present invention is to provide a printer and a printing system capable of printing Anoto electronic form data when, and only when, the data are output from a qualified application program and received by a qualified printer, without requiring significant modifications of existing printer programs or the Anoto electronic form data specification.

The invention provides a novel printing system including a printer and a host device. Particular information is set in the printer as a qualification designation. The host device sends print information created by a particular application program to the printer. The particular application program has an information adding unit for appending added information corresponding to the particular information to the print information.

The printer includes a decision unit and a print processing unit. The decision unit decides whether the print information transmitted from the host device includes the added information and whether the added information corresponds to the particular information set in the printer. The print processing unit prints the print information if the decision unit decides that the print information includes the added information and that the added information corresponds to the particular information, but discards the print information if the decision unit decides that the print information does not include the added information, or if the decision unit decides that the print information includes the added information but the added information does not correspond to the particular information.

The invention also provides a novel printer including the above decision unit and print processing unit and an accepting unit for accepting input of the particular information and/or print information created by a particular application program, a storage unit for storing the particular information, and a particular information setting unit for setting the particular information stored in the storage unit as a qualification designation when the information accepted via the accepting unit is print information.

BRIEF DESCRIPTION OF THE DRAWINGS

In the attached drawings:

FIG. 2 shows an exemplary PostScript file transmitted from host computer A in FIG. 1 to the printer;

FIG. 3 shows an exemplary PostScript file transmitted from host computer B in FIG. 1 to the printer;

FIG. 10 is an exemplary PostScript file sent from host computer A to the printer in the second embodiment of the invention;

FIG. 11 is an exemplary PostScript file sent from host computer B to the printer in the second embodiment;

DETAILED DESCRIPTION OF THE INVENTION

Figure 1:
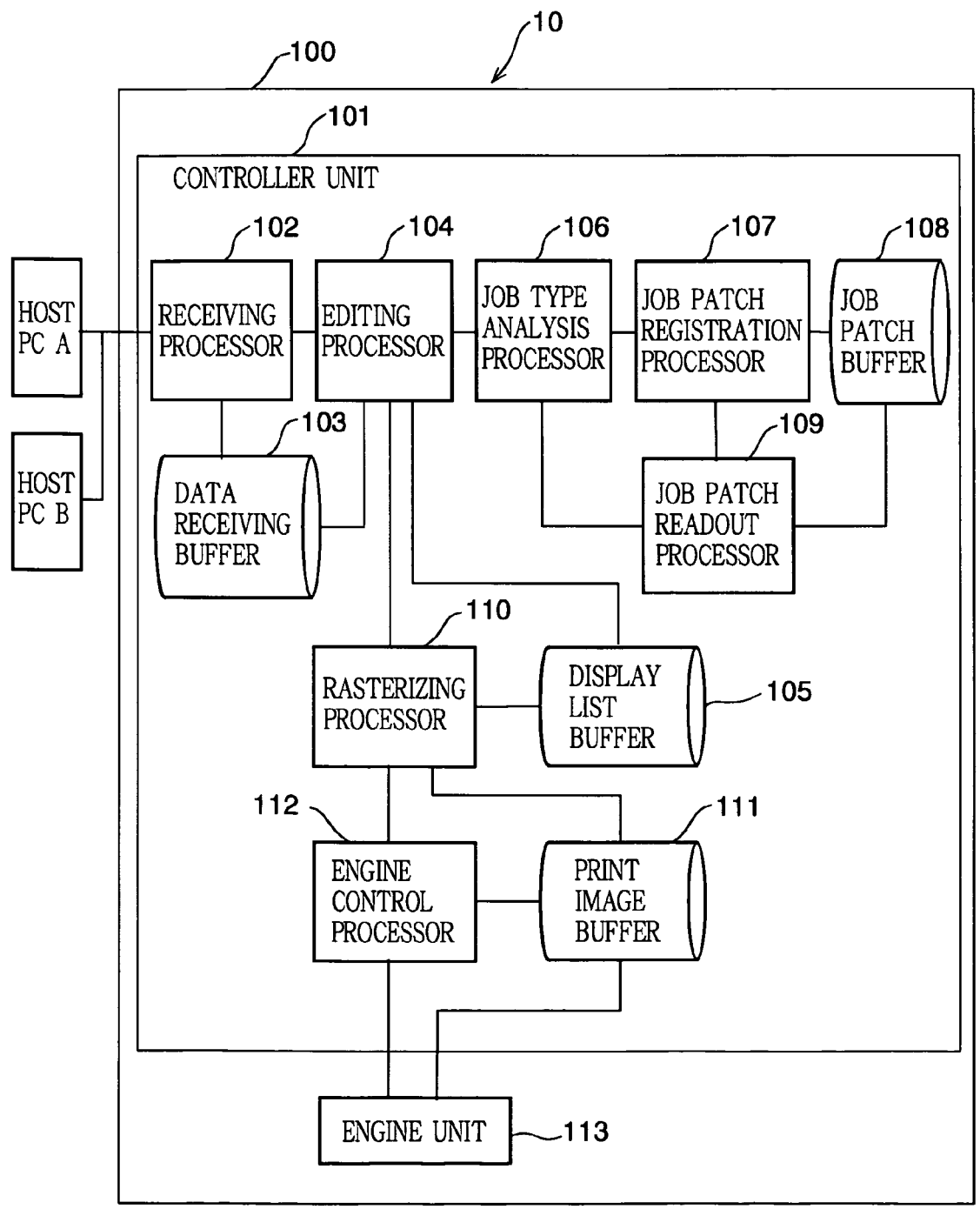
FIG. 1 is a block diagram schematically illustrating the structure of a printing system in first and second embodiments of the invention.

Embodiments of the invention will now be described with reference to the attached drawings, in which like elements are indicated by like reference characters.

First Embodiment

Referring to FIG. 1, the printing system 10 in the first embodiment includes a pair of host computers (personal computers: PCs) A, B and a printer 100. The printer 100 receives given information (referred to below as a job patch) designating the printer 100 as a qualified printer from host computer A, receives Anoto electronic form data as print information from host computer B, and prints images based on the Anoto electronic form data on print media.

Host computer A is connected to the printer 100 by a network, for example, and designates the printer 100 as a qualified printer by sending the job patch.

Host computer B is also connected to the printer 100 by a network, for example, and can send print information to the printer 100 by sending Anoto electronic form data created by an Anoto electronic form creation application program in a particular Anoto electronic form creation system.

The printer 100 includes a controller unit 101 and an engine unit 113. The controller unit 101 is a print processing unit that analyzes job patches sent from host computer A and Anoto electronic form data or other data sent from host computer B and generates print image data. The engine unit 113 prints images according to the print image data on print media.

The controller unit 101 includes a receiving processor 102, a data receiving buffer 103, an editing processor 104, a display list buffer 105, a job type analysis processor 106, a job patch registration processor 107, a job patch buffer 108, a job patch readout processor 109, a rasterizing processor 110, a print image buffer 111, and an engine control processor 112.

The receiving processor 102 is an accepting unit that accepts the job patch sent from host computer A and Anoto electronic form data or other data sent from host computer B. The receiving processor 102 has the data receiving buffer 103 store the received data and issues a command to the editing processor 104 to analyze the received data.

The data receiving buffer 103 is a storage unit for storing the data received by the receiving processor 102.

Upon receiving an analysis command from the receiving processor 102, the editing processor 104 reads the data stored in the data receiving buffer 103, analyzes the data, and has the display list buffer 105 store the results of the analysis. The editing processor 104 also issues a command to the rasterizing processor 110 to generate print image data.

The display list buffer 105 is a storage unit for storing the results of data analyses performed by the editing processor 104.

The job type analysis processor 106 is a decision unit that determines the type of the data stored in the data receiving buffer 103 when the editing processor 104 analyzes the data. The job type analysis processor 106 determines whether the data relate to the registration of a job patch, that is, to the designation of the printer 100 as a qualified printer, or whether the data relate to the execution of a PostScript job such as the printing of images based on the Anoto electronic form data on print media.

When the job type analysis processor 106 determines that the received data relate to the registration of a job patch, the job patch registration processor 107 has the job patch buffer 108 store the job patch.

The job patch buffer 108 is a storage unit for storing and registering the job patch as instructed by the job patch registration processor 107.

When the job type analysis processor 106 determines that the received data pertain to the execution of a PostScript job, the job patch readout processor 109 reads and executes the job patch stored in the job patch buffer 108 before execution of the PostScript job, which is stored in the data receiving buffer 103, thereby functioning as a particular information setting unit and a decision unit.

Upon receiving an expansion start command from the editing processor 104, the rasterizing processor 110 reads the results of data analysis made by the job type analysis processor 106 from the display list buffer 105, generates print image data, and has the print image buffer 111 store the print image data. The rasterizing processor 110 also gives a command to the engine control processor 112 to print images based on the print image data.

The print image buffer 111 is a storage unit for storing the print image data generated by the rasterizing processor 110.

Upon receiving a print command from the rasterizing processor 110, the engine control processor 112 reads the print image data from the print image buffer 111 and has the engine unit 113 print images according to the print image data.

The engine unit 113 is an electrophotographic print engine, for example, that prints images according to print image data on print media under the control of the engine control processor 112.

The controller unit 101 comprises a collection of programs which may be stored in a volatile memory such as a random access memory (RAM), a non-volatile memory such as a read-only memory (ROM), a rewritable memory such as a flash memory, or a magnetic storage medium such a hard disk in the printer 100. The functions of the controller unit 101 are carried out when these programs are executed by a central processing unit (CPU, not shown) of the printer 100.

Besides the elements described above, the printer 100 has other well-known facilities, including a display facility such as a liquid crystal display (LCD), for example, with a screen for displaying the status of the printer 100, and a human interface with input means such as a touch screen, for example, on which a user can enter commands.

The printing system 10 structured as described above enables Anoto electronic form data output from an application program in a particular system to be printed only when received by a qualified printer, without requiring significant modifications of existing printer programs or the Anoto electronic form data specification.

The operation of the printing system 10 including the elements described above will now be described. In the following description, the printer 100 first receives a PostScript file 20 such as the one shown in FIG. 2 as a job patch from host computer A, and then receives a PostScript file 30 such as the one shown in FIG. 3 as Anoto electronic form data from host computer B.

When the receiving processor 102 receives any PostScript file, it first stores the received PostScript file in the data receiving buffer 103 and issues a command to the editing processor 104 to analyze the file.

Upon receiving the analysis command from the receiving processor 102, the editing processor 104 reads the PostScript file stored in the data receiving buffer 103 and issues a command to the job type analysis processor 106 to determine whether the PostScript file is to be used for making initial settings in the printer 100 or to be executed as a PostScript job.

Figure 4:
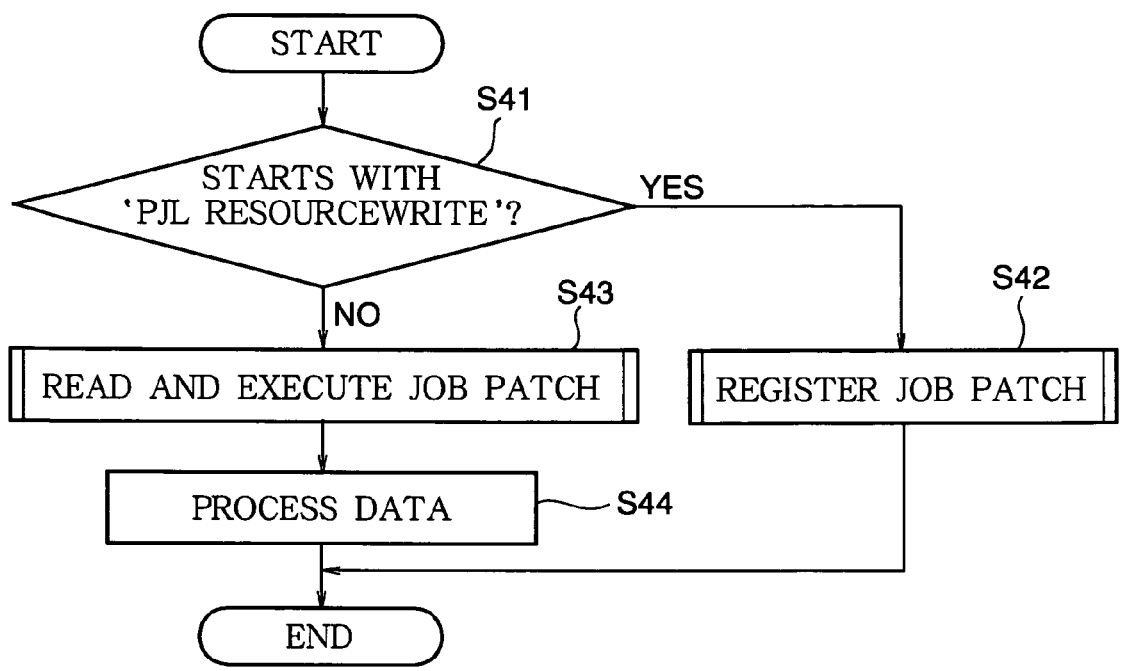
FIG. 4 is a flowchart illustrating operation of the job type analysis processor in FIG. 1.

The job type analysis processor 106 executes the analysis procedure illustrated in the flowchart in FIG. 4. In step S41, the job type analysis processor 106 checks whether the PostScript file stored in the data receiving buffer 103 begins with the printer job language (PJL) command @PJL RESOURCEWRITE as shown in FIG. 2. The initial %-12345X in the first line of the PostScript file 20 in FIG. 2 is a Universal Exit Language string; the editing processor 104 starts reading the file from the character following this string.

If the PostScript file begins with @PJL RESOURCEWRITE (Yes in step S41), the job type analysis processor 106 decides that the PostScript file stored in the data receiving buffer 103 is a job patch that has been sent from host computer A to designate the printer 100 as a qualified printer. The job type analysis processor 106 issues a command to the job patch registration processor 107 to register the PostScript file stored in the data receiving buffer 103. By carrying out this command, the job patch registration processor 107 registers the job patch (step S42).

Figure 5:
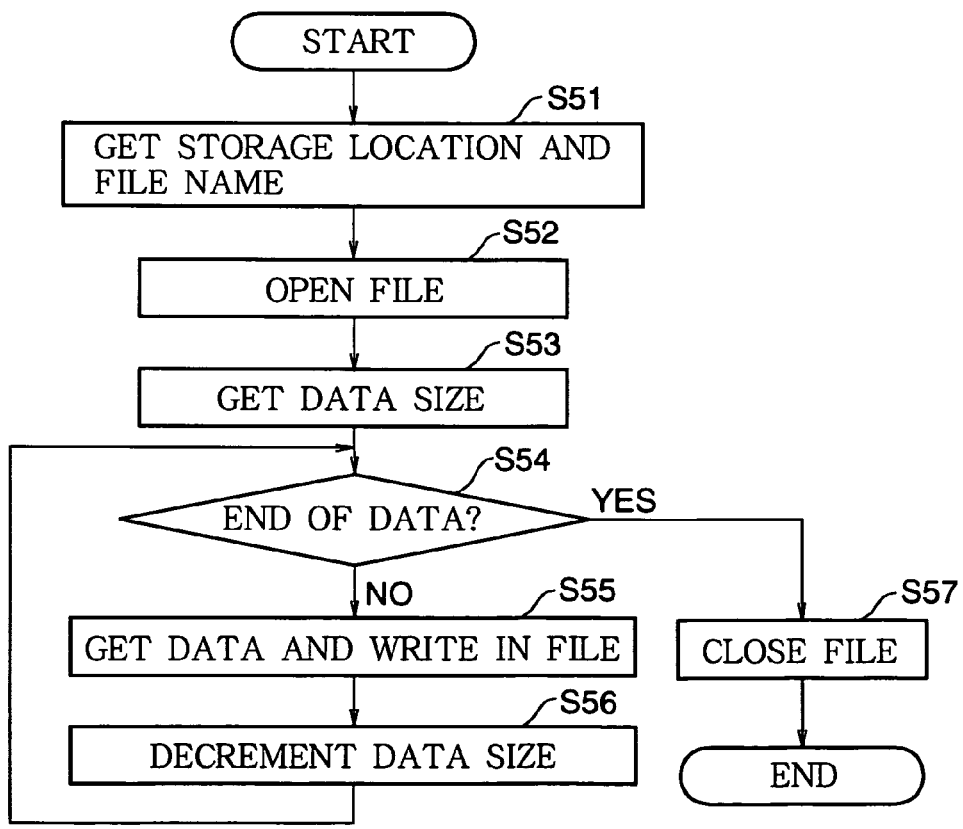
FIG. 5 is a flowchart illustrating the operation of the job patch registration processor.

The job patch registration procedure will be described with reference to the flowchart in FIG. 5. By reading the PostScript file 20 stored in the data receiving buffer 103, the job patch registration processor 107 obtains a storage location and file name to be assigned to the job patch (step S51). In the PostScript file 20 shown in FIG. 2, LOCATION="PsGeneralAccess DriverProc" indicates that the job patch is to be stored in a PsGeneralAccess area in the job patch buffer 108 under the file name DriverProc.

The job patch registration processor 107 creates a file having the file name obtained in step S51 and opens the file, allowing write access (step S52).

The job patch registration processor 107 then obtains the data size of the PostScript file 20 to be registered as a job patch (step S53). In FIG. 2, the data size of the PostScript file 20 is 80,390 bytes, as indicated by SIZE=80390. The entire PostScript file 20 will be stored in the job patch buffer 108.

Steps S54 to S56 form a loop in which the job patch registration processor 107 repeatedly writes data into the job patch buffer 108 and decrements the data size obtained in step S53. In step S54, the job patch registration processor 107 decides whether the decremented data size has reached zero yet. If not (No in step S54), then in step S55, the job patch registration processor 107 reads one byte of data from the file stored in the data receiving buffer 103 and writes the byte into the file opened in step S52 in the job patch buffer 108; in step S56, the job patch registration processor 107 decreases the data size obtained in step S53 by one byte; the procedure then returns to S54.

When the data size obtained in step S53 has been decremented to zero (Yes in step S54), the job patch registration processor 107 closes the file (step S57). The job patch has now been registered.

If the PostScript file stored in the data receiving buffer 103 does not begin with @PJL RESOURCEWRITE (No in step S41 in FIG. 4), the job type analysis processor 106 assumes that the PostScript file stored in the data receiving buffer 103 is a PostScript job sent to be executed to print, for example, an Anoto electronic form. In this case the job type analysis processor 106 issues a command to the job patch readout processor 109 to read the job patch. Upon receiving the job patch read command from the editing processor 104, the job patch readout processor 109 reads the job patch from the job patch buffer 108 (step S43) and executes the processing described therein (step S44).

Figure 6:
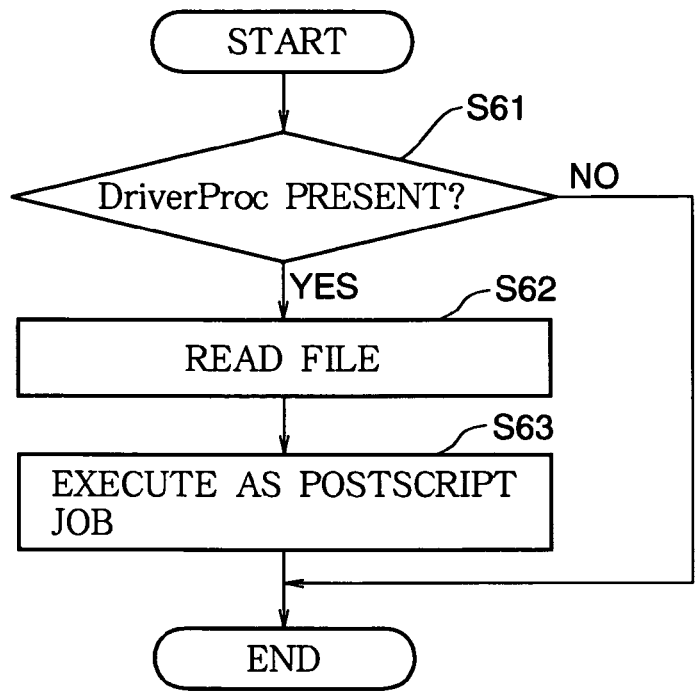
FIG. 6 is a flowchart illustrating the operation of the job patch readout processor.

The job patch reading process will be described with reference to the flowchart in FIG. 6. Upon receiving the job patch read command from the job type analysis processor 106, the job patch readout processor 109 checks whether the job patch buffer 108 holds a file named DriverProc. If the job patch DriverProc has been registered as described in FIG. 5 and is stored in the job patch buffer 108 (Yes in step S61), the job patch readout processor 109 reads the job patch (step S62) and executes it as a PostScript job (step S63) before the PostScript file 30 stored in the data receiving buffer 103 is executed.

The execution of the PostScript job shown in FIG. 2 by the job patch readout processor 109 will be described with reference to the flowchart in FIG. 7. The first step S71 in FIG. 7 corresponds to line (1) in FIG. 2, in which the PostScript operator def defines /C5900_ANOTO as a key object with the value true and limits access to this object to execution access only. This definition declares that the printer is qualified. The second step S72 in FIG. 7 corresponds to line (2) and the following lines in FIG. 2, in which the PostScript interpreter's standard font definition operator /definefont is replaced by a new definition operator that defines how the PostScript file 30, which is awaiting execution, is to be executed by the editing processor 104, depending on whether or not the PostScript file 30 includes qualified Anoto electronic form data, to prevent the printing of unqualified Anoto electronic form data.

When the job patch readout processor 109 finishes executing the PostScript file 20 as a job patch, the editing processor 104 executes the processing of the PostScript file 30 held in the data receiving buffer 103. The execution of the PostScript job shown in FIG. 3 will be described with reference to the flowcharts in FIGS. 8 and 9.

Figure 8:
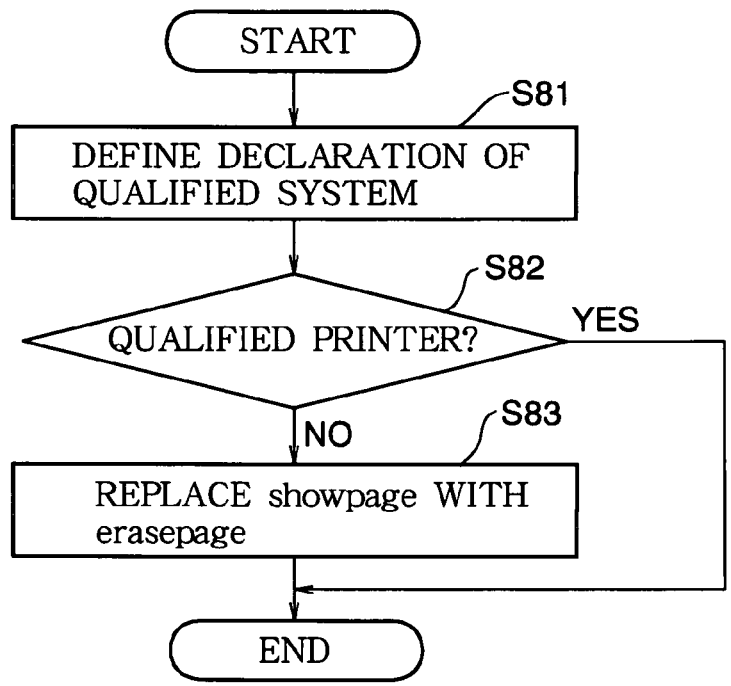
FIGS. 8 and 9 are flowcharts illustrating the execution of a PostScript job by the editing processor.

The first step S81 in FIG. 8 corresponds to line (3) in FIG. 3, which assigns the value C5900_ANOTO to the JobName key in the PostScript interpreter's user dictionary. This assignment is a declaration that the PostScript file 30 has been created by an Anoto electronic form creation application program in a particular Anoto electronic form creation system.

The next step S82 in FIG. 8 corresponds to line (4) and the following lines in FIG. 3, which determine whether the printer is qualified, i.e., whether the stack includes a /Proset resource in which there is a /Driverops dictionary in which the /C5900_ANOTO key is declared and whether the value of the /C5900_ANOTO key is true. If the /C5900_ANOTO key is present and its value is true (Yes in step S82), the process in FIG. 8 ends, and a proprietary Anoto dot pattern is defined by a PostScript job as explained below. If the /C5900_ANOTO key is not present or if its value is not true (No in step S82), then the Anoto electronic form data created by the Anoto electronic form creation application program in the particular Anoto electronic form creation system have been sent to a printer with a PostScript interpreter that has not been qualified by the particular Anoto electronic form creation system as being capable of printing Anoto electronic form data. In this case the PostScript interpreter's standard print operator /showpage is replaced with the page erasing operator /erasepage (step S83). Therefore, if Anoto-qualified electronic form data created by a particular Anoto electronic form creation system are sent to a printer with a PostScript interpreter that has not been qualified by the Anoto electronic form creation system, the Anoto electronic form data will not be printed.

The printer 100 in the first embodiment, however, has been qualified by the patch job in FIG. 2, in which the def operator has defined the /C5900_ANOTO key as true, so step S83 in FIG. 8 is not executed. Whenever Anoto electronic form data created by an application program in the particular Anoto electronic form creation system are sent to the printer 100 in FIG. 1 after the printer 100 has registered the job patch (PostScript file 20) designating the printer's PostScript interpreter as qualified by the particular Anoto electronic form creation system, step S83 in FIG. 8 is not executed.

After completion of the process shown in FIG. 8, execution of the PostScript job in FIG. 3 continues and the editing processor 104 defines the proprietary dot pattern. The proprietary dot pattern is defined by a font definition in the PostScript language. In FIG. 3, the definition is executed by the statement /AnotoFont exch definefont pop in line (5).

Figure 9:
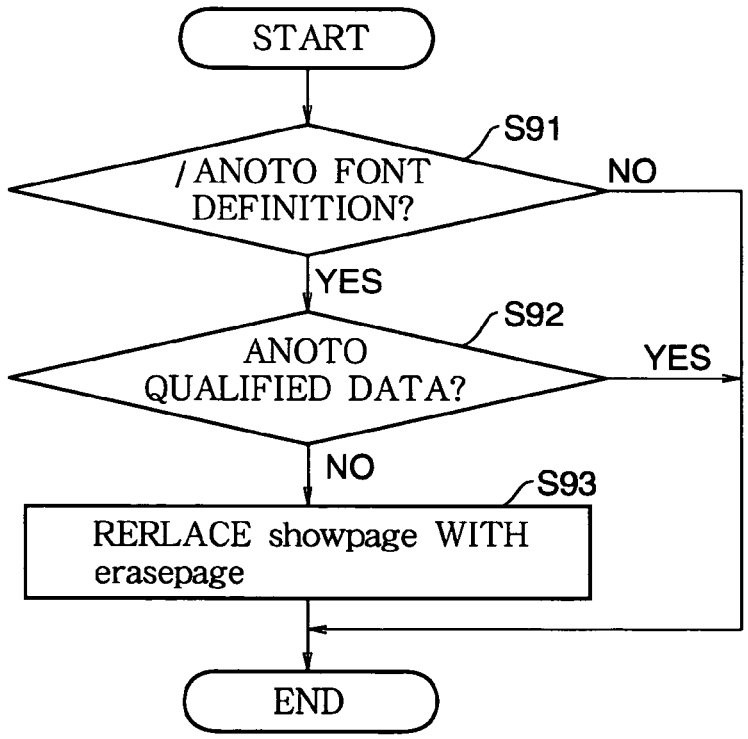

The editing processor 104 executes the PostScript job as shown in the flowchart in FIG. 9. The /definefont operator in line (5) in FIG. 3 has already been replaced, in step S72 in FIG. 7, by the newly defined operator in line (2) in FIG. 2, so in the processing described below, the newly defined /definefont operator is executed.

In step S91, the editing processor 104 determines whether the name of the PostScript font defined by the /definefont operator is /AnotoFont. If the defined font name is /Anoto-Font (step S91), the PostScript job processing proceeds to step S92, in which the editing processor 104 further determines whether the value of the /JobName key in the PostScript interpreter's user dictionary is C5900_ANOTO (step S92).

If the /JobName key has not been declared or if its value has not been set to C5900_ANOTO (No in step S92), the editing processor 104 decides that the Anoto electronic form data have been created by an Anoto electronic form creation application program in some system other than the particular Anoto electronic form creation system, and replaces the PostScript interpreter's standard print operator /showpage with the page erasing operator /erasepage (step S93). Therefore, Anoto electronic form data created by an Anoto electronic form creation application program in an unqualified system will not be printed by a printer with a PostScript interpreter qualified by the particular Anoto electronic form creation system, even if the data are sent to this printer.

If the /JobName key has been declared and if its value is C5900_ANOTO (Yes in step S92), the editing processor 104 has the display list buffer 105 store the results of the analysis, and issues a command to the rasterizing processor 110 to generate print image data.

Upon receiving this command from the editing processor 104, the rasterizing processor 110 reads the results of the analysis performed by the editing processor 104 from the display list buffer 105, generates print image data, and has the print image buffer 111 store the print image data. The rasterizing processor 110 issues a command to the engine control processor 112 to print images based on the print image data.

Upon receiving the print command from the rasterizing processor 110, the engine control processor 112 reads the print image data from the print image buffer 111 and has the engine unit 113 print images based on the print image data.

Under the control of the engine control processor 112, the engine unit 113 carries out a well-known electrophotographic printing process, for example, to print images according to the print image data on print media.

In the first embodiment, when a printer receives Anoto electronic form data created by an application program in the particular Anoto electronic form creation system, the data include PostScript code that checks whether the printer has been qualified by the particular Anoto electronic form creation system. If the printer has been qualified, it will print the data. If the printer has not been qualified, however, the /erasepage operator will be executed in place of the /showpage operator, and the data will not be printed.

Conversely, when a printer qualified by the particular Anoto electronic form creation system receives Anoto electronic form data, it checks whether the data have been created by an Anoto electronic form creation application program in the particular Anoto electronic form creation system, and prints the received data if this is the case. If the received Anoto electronic form data have been created by an Anoto electronic form creation application program in some other system, however, then once again the /erasepage operator is executed in place of the /showpage operator and the data are not printed.

The first embodiment accordingly enables a qualified application program to prevent its Anoto electronic form data from being printed by an unqualified printer, and enables a qualified printer to refuse to print Anoto electronic form data created by an unqualified application program. If the first embodiment is used, then Anoto electronic form data will be printed when, and only when, the data have been created by a qualified application program and received by a qualified printer. This assurance is moreover provided without requiring significant modifications of existing printer programs or the Anoto electronic form data specification.

Second Embodiment

The printing system in the second embodiment of the present invention has substantially the same structure as the printing system in the first embodiment and executes PostScript jobs in substantially the same way as in the first embodiment, but uses a different job patch and different added information.

FIG. 10 shows an exemplary PostScript file 20' sent as a job patch from host computer A in the second embodiment. FIG. 11 shows an exemplary PostScript file 30' sent as Anoto electronic form data from host computer B in the second embodiment. The difference from the first embodiment is that the PostScript interpreter's standard print operator /showpage is replaced by an undefined operator /undefined-operator in line (2)' in FIG. 10 and in line (4)' in FIG. 11. Because /undefined-operator is not a standard PostScript operator and is not defined in the PostScript interpreter's system dictionary or user dictionary, the execution of this operator will end in an error.

The operation of the printing system in the second embodiment will now be described. When the receiving processor 102 receives a PostScript file from a host computer, it first stores the received PostScript file in the data receiving buffer 103 and issues a command to the editing processor 104 to analyze the file.

Upon receiving the analysis command from the receiving processor 102, the editing processor 104 reads the PostScript file stored in the data receiving buffer 103 and issues a command to the job type analysis processor 106 to determine whether the PostScript file is to be used to designate the printer 100 as a qualified printer or to be executed as a PostScript job.

The job type analysis processor 106 executes the analysis procedure illustrated in the flowchart in FIG. 4. In step S41, the job type analysis processor 106 checks whether the PostScript file stored in the data receiving buffer 103 begins with the PJL command @PJL RESOURCEWRITE, following the Universal Exit Language string %-12345X, as shown in FIG. 10.

If the PostScript file begins with @PJL RESOURCEWRITE (Yes in step S41), the job type analysis processor 106 decides that the PostScript file stored in the data receiving buffer 103 is a job patch that has been sent to designate the printer 100 as a qualified printer. The job type analysis processor 106 issues a command to the job patch registration processor 107 to register the PostScript file stored in the data receiving buffer 103. By carrying out this command, the job patch registration processor 107 registers the job patch (step S42).

The job patch registration procedure will be described with reference to the flowchart in FIG. 5. By reading the PostScript file 20', the job patch registration processor 107 obtains a storage location and file name to be assigned to the job patch (step S51). In the PostScript file 20' shown in FIG. 10, LOCATION="PsGeneralAccess DriverProc" indicates that the job patch is to be stored in a PsGeneralAccess area in the job patch buffer 108 under the file name DriverProc.

The job patch registration processor 107 creates a file having the file name obtained in step S51 and opens the file to allow writing (step S52).

The job patch registration processor 107 then obtains the data size of the PostScript file 20' to be registered as a job patch (step S53). In FIG. 10, the data size of the PostScript file 20' is 80,390 bytes, as indicated by SIZE=80390. The entire PostScript file 20' will be stored in the job patch buffer 108.

Steps S54 to S56 form a loop in which the job patch registration processor 107 repeatedly writes data into the job patch buffer 108 and decrements the data size obtained in step S53. In step S54, the job patch registration processor 107 decides whether the decremented data size has reached zero yet. If not (No in step S54), then in step S55, the job patch registration processor 107 reads one byte of data from the file stored in the data receiving buffer 103 and writes the byte into the file opened in step S52 in the job patch buffer 108; in step S56, the job patch registration processor 107 decreases the data size obtained in step S53 by one byte; the procedure then returns to S54.

When the data size obtained in step S53 has been decremented to zero (Yes in step S54), the job patch registration processor 107 closes the file (step S57). The job patch has now been registered.

If the PostScript file stored in the data receiving buffer 103 does not begin with @PJL RESOURCEWRITE (No in step S41 in FIG. 4), the job type analysis processor 106 assumes that the PostScript file stored in the data receiving buffer 103 is a PostScript job sent to be executed to print, for example, an Anoto electronic form. In this case the job type analysis processor 106 issues a command to the job patch readout processor 109 to read the job patch. Upon receiving the job patch read command from the job type analysis processor 106, the job patch readout processor 109 reads the job patch from the job patch buffer 108 (step S43) and executes the processing described therein (step S44).

The job patch reading process will be described with reference to the flowchart in FIG. 6. Upon receiving the job patch read command from the job type analysis processor 106, the job patch readout processor 109 checks whether the job patch buffer 108 holds a file named DriverProc. If the job patch DriverProc has been registered as described in FIG. 5 and is stored in the job patch buffer 108 (Yes in step S61), the job patch readout processor 109 reads the job patch (step S62) and executes it as a PostScript job (step S63) before the PostScript file 30' stored in the data receiving buffer 103 is executed.

The execution of the PostScript job shown in FIG. 10 by the job patch readout processor 109 will be described with reference to the flowchart in FIG. 7. The first step S71 in FIG. 7 corresponds to line (1) in FIG. 10, in which the PostScript operator def defines /C5900_ANOTO as a key object with the value true and limits access to this object to execution access only. The second step S72 in FIG. 7 corresponds to line (2)' and the following lines in FIG. 10, in which the PostScript interpreter's standard font definition operator /definefont is replaced by a new operator that defines how the PostScript file 30', which is awaiting execution, is to be executed by the editing processor 104, depending on whether or not the PostScript file 30' comprises qualified Anoto electronic form data.

When the job patch readout processor 109 finishes executing the PostScript file 20' as a job patch, the editing processor 104 executes the processing of the PostScript file 30' held in the data receiving buffer 103. The execution of the PostScript job shown in FIG. 11 will be described with reference to the flowcharts in FIGS. 12 and 13.

Figure 12:
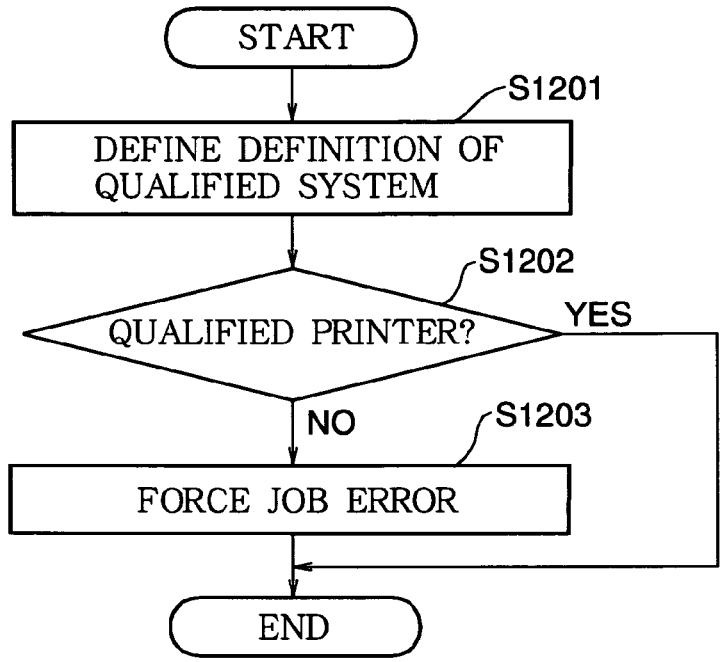
FIG. 12 is a flowchart illustrating the execution of a PostScript job by the job patch readout processor in the second embodiment.

The first step S1201 in FIG. 12 corresponds to line (3) in FIG. 11, which assigns the value C5900_ANOTO to the JobName key in the PostScript interpreter's user dictionary. This assignment is a declaration that the PostScript file 30' has been created by an Anoto electronic form creation application program in a particular Anoto electronic form creation system.

The next step S1202 in FIG. 12 corresponds to line (4)' and the following lines in FIG. 11, which determine whether the stack includes a /Proset resource in which there is a /DriverOps dictionary in which the /C5900_ANOTO key is declared and whether the value of the /C5900_ANOTO key is true. If the /C5900_ANOTO key is present and its value is true (Yes in step S1202), the process in FIG. 12 ends, and a proprietary Anoto dot pattern is defined by a PostScript job as explained below. If the /C5900_ANOTO key is not present or if its value is not true (No in step S1202), then the Anoto electronic form data created by the Anoto electronic form creation application program in the particular Anoto electronic form creation system have been sent to a printer with a PostScript interpreter that has not qualified by the particular Anoto electronic form creation system as being capable of printing Anoto electronic form data. In this case the PostScript interpreter's standard print operator /showpage is replaced with an undefined operator /undefined-operator to force the job to end in an error (step S1203). Therefore, if Anoto-qualified electronic form data created by a particular Anoto electronic form creation system are sent to a printer with a PostScript interpreter that has not been qualified by the Anoto electronic form creation system, the Anoto electronic form data will not be printed.

Figure 7:
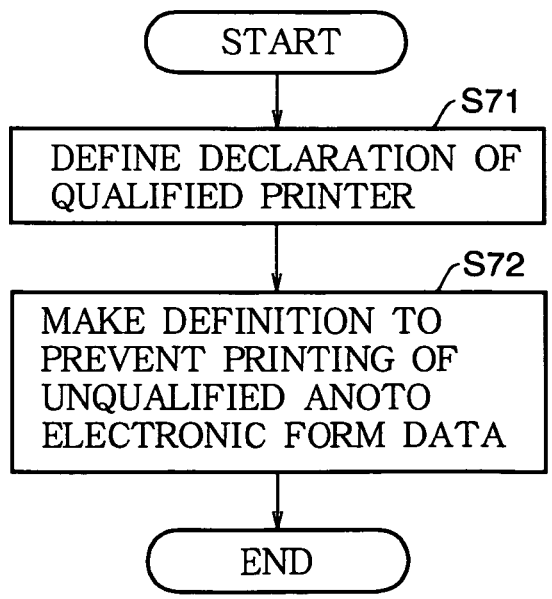
FIG. 7 is a flowchart illustrating the execution of a PostScript job by the job patch readout processor.

The printer 100 in the second embodiment, however, has been qualified by the patch job in FIG. 7, in which the def operator has defined the /C5900_ANOTO key as true, so step S1203 in FIG. 12 is not executed. Whenever Anoto electronic form data created by an application program in the particular Anoto electronic form creation system are sent to the printer 100 in FIG. 1 after it has registered the job patch (PostScript file 20') designating the printer's PostScript interpreter as having been qualified by the particular Anoto electronic form creation system, step S1203 in FIG. 12 is not executed.

After the process shown in FIG. 12 is completed, execution of the PostScript job in FIG. 11 continues and the editing processor 104 defines the proprietary dot pattern. The proprietary dot pattern is defined by a font definition in the PostScript language. In FIG. 11, the definition is executed by the statement /AnotoFont exch definefont pop in line (5).

Figure 13:
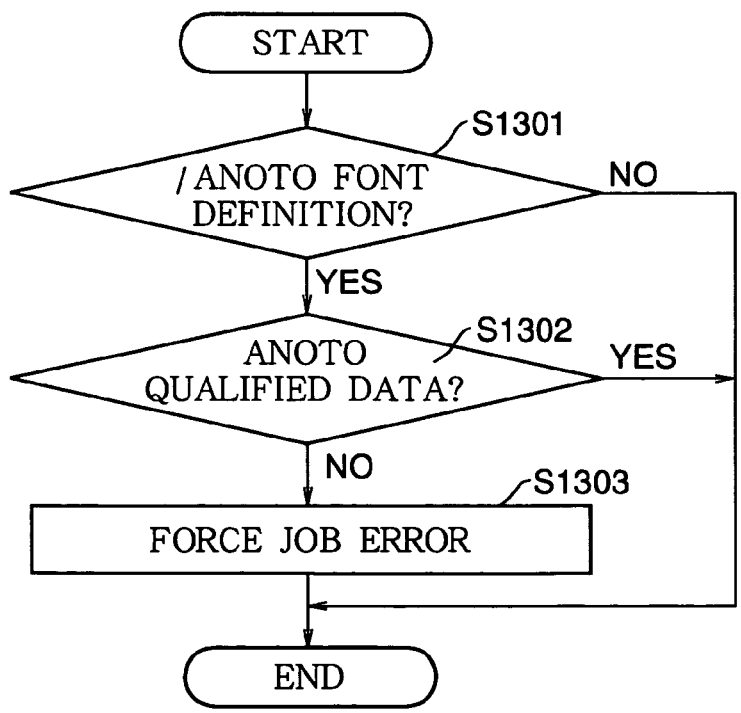
FIG. 13 is a flowchart illustrating the execution of a PostScript job by the editing processor in the second embodiment.

The editing processor 104 executes the PostScript job as shown in the flowchart in FIG. 13. The /definefont operator in line (5) in FIG. 11 has already been replaced, in step S72 in FIG. 7, by the newly defined operator in line (2) in FIG. 10, so in the processing described below, the newly defined /definefont operator is executed.

In step S1301, the editing processor 104 determines whether the name of the PostScript font defined by the /definefont operator is /AnotoFont. If the defined font name is /AnotoFont (Yes in step S1301), the PostScript job processing proceeds to step S1302, in which the editing processor 104 further determines whether the value of the /JobName key in the PostScript interpreter's user dictionary is C5900_ANOTO (step S1302).

If the /JobName key has not been declared or if its value has not been set to C5900_ANOTO (No in step S1302), the editing processor 104 decides that the Anoto electronic form data have been created by an Anoto electronic form creation application program in some system other than the particular Anoto electronic form creation system, and replaces the PostScript interpreter's standard print operator /showpage with an undefined operator /undefined-operator to force the job to end in an error (step S1303). When the PostScript interpreter detects an error during the analysis of a PostScript operator, it immediately stops the PostScript job execution process, receives the entire PostScript file data, up to the end of the file (EOF), from the data receiving buffer 103, and erases the data. Therefore, Anoto electronic form data created by an Anoto electronic form creation application program in an unqualified system will not be printed by a printer with a PostScript interpreter qualified by the particular Anoto electronic form creation system, even if the data are sent to this printer.

If the /JobName key has been declared and if its value is C5900_ANOTO (Yes in step S1302), the editing processor 104 has the display list buffer 105 store the results of the analysis, and issues a command to the rasterizing processor 110 to generate print image data.

Upon receiving this command from the editing processor 104, the rasterizing processor 110 reads the results of the analysis performed by the editing processor 104 from the display list buffer 105, generates print image data, has the print image data stored in the print image buffer 111, and issues a command to the engine control processor 112 to print images based on the print image data.

Upon receiving the print command from the rasterizing processor 110, the engine control processor 112 reads the print image data from the print image buffer 111 and has the engine unit 113 print images based on the print image data.

Under the control of the engine control processor 112, the engine unit 113 carries out a well-known electrophotographic printing process, for example, to print images according to the print image data on print media.

In the second embodiment, when a printer receives Anoto electronic form data created by an application program in the particular Anoto electronic form creation system, the data include PostScript code that checks whether the printer has been qualified by the particular Anoto electronic form creation system. If the printer has been qualified, it will print the data. If the printer has not been qualified, however, an undefined operator (/undefined-operator) will be executed in place of the /showpage operator, and the data will not be printed.

Conversely, when a printer qualified by the particular Anoto electronic form creation system receives Anoto electronic form data, it checks whether the data have been created by an Anoto electronic form creation application program in the particular Anoto electronic form creation system, and prints the received data if this is the case. If the received Anoto electronic form data have been created by an Anoto electronic form creation application program in some other system, however, then once again the undefined operator (/undefined-operator) is executed in place of the /showpage operator and the data are not printed.

The second embodiment accordingly enables a qualified application program to prevent its Anoto electronic form data from being printed by an unqualified printer, and enables a qualified printer to refuse to print Anoto electronic form data created by an unqualified application program. If the second embodiment is used, then Anoto electronic form data will be printed when, and only when, the data have been created by a qualified application program and received by a qualified printer.

Figure 14:
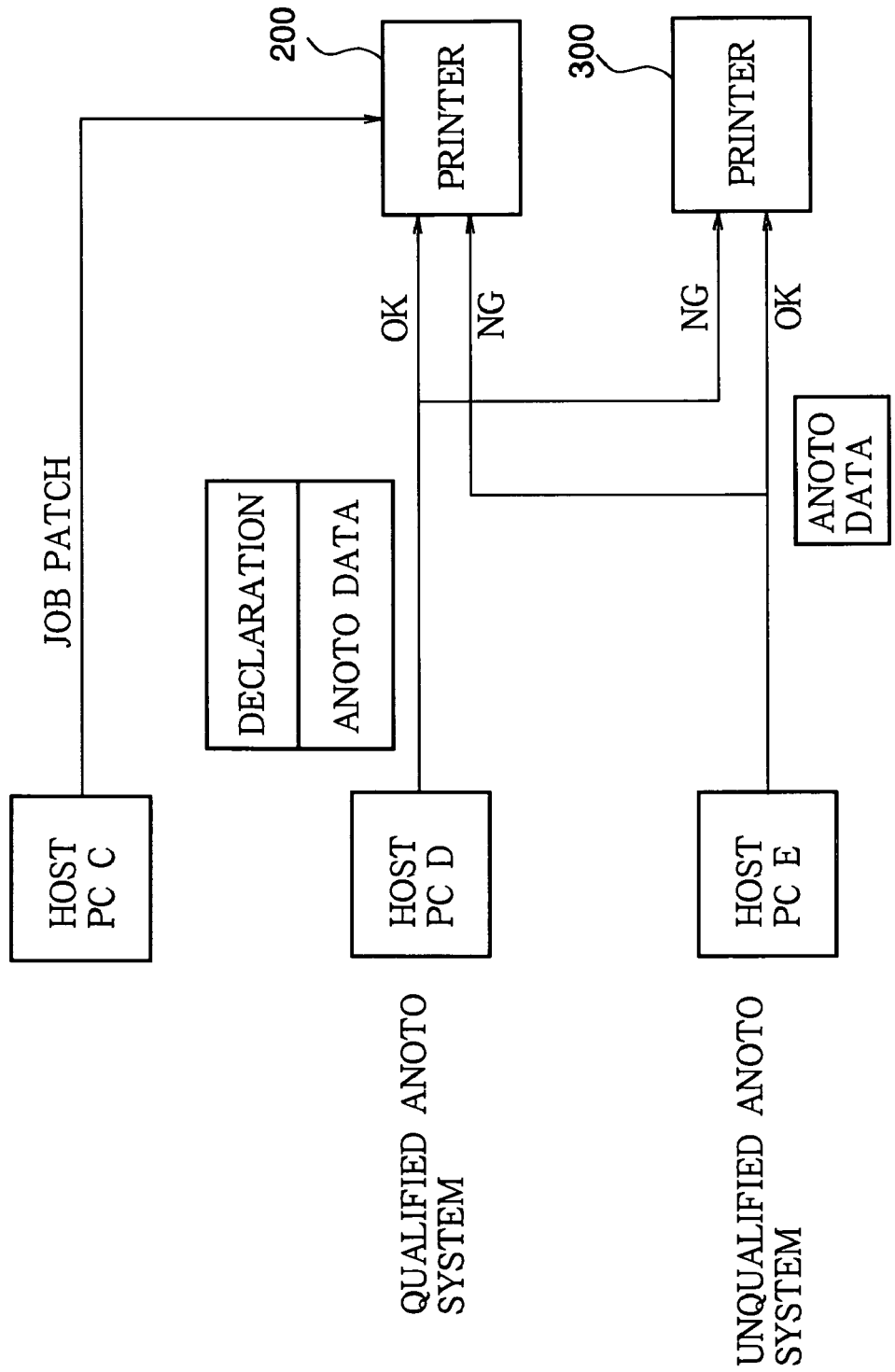
FIG. 14 is a block diagram illustrating another exemplary printing system in which the present invention is used.

The invention is not limited to use in a printing system like the printing system 10 described above, in which a single printer 100 receives a job patch from host computer A and receives Anoto electronic form data from host computer B. The invention can be applied to other printing systems, such as the system shown in FIG. 14, in which host computer C sends the job patch designating a qualified PostScript interpreter, host computer D sends Anoto electronic form data created by an Anoto electronic form creation application program in a particular, i.e., qualified, Anoto electronic form creation system, host computer E sends Anoto electronic form data created by an Anoto electronic form creation application program in an unqualified Anoto electronic form creation system, printer 200 has a qualified PostScript interpreter, and printer 300 has an unqualified PostScript interpreter. After host computer C sends the job patch to printer 200 and printer 200 registers it, Anoto electronic form data (Anoto data with an added declartion) created on host computer D can be printed by printer 200, as indicated by the notation 'OK', but not on printer 300, as indicated by the notation 'NG'. Conversely, Anoto electronic form data created on host computer E (Anoto data without the added declaration) may be printable by printer 300, but cannot be printed by printer 200.

A printer with a PostScript interpreter has been described above, but the present invention can be applied to other equipment, such as a facsimile machine having a PostScript interpreter or a multifunction peripheral having a PostScript interpreter.

Those skilled in the art will recognize that further variations are possible within the scope of the invention, which is defined in the appended claims.

What is claimed is:

1. A printing system including a printer for which particular information is set as a qualification designation and a host device for transmitting print information created by a particular application to the printer, wherein:
   the print information includes a print output instruction;
   the particular application has an information adding unit for appending added information corresponding to the particular information to the print information;
   the added information includes a decision instruction for deciding whether the print information includes the particular information, and a print/non-print instruction for allowing the print output instruction to be executed if the particular information has been set to the printer, and for causing the print output instruction to be replaced with a print disabling instruction and then executing the print disabling instruction if the particular information has not been set to the printer; and
   the printer comprises
      a decision unit configured to execute the decision instruction for deciding whether the print information transmitted from the host device includes the particular information; and
      a print processing unit that executes printing of the print information, wherein if the decision unit decides during execution of the print information that the print information includes the particular information, the print processing unit executes the print/non-print instruction, thereby enabling printing of the print information; and
   wherein if the decision unit decides during execution of the print information that the print information does not include the particular information, the print processing unit executes the print/non-print instruction, thereby disabling printing of the print information.

2. The printing system of claim 1, wherein the printing disabling instruction is an information deletion instruction.

3. The printing system of claim 1, wherein the printing disabling instruction is an undefined processing execution instruction.

4. A printer comprising:
   an accepting unit for accepting input of particular information and/or print information created by a particular application program, the print information including a print output instruction and added information, wherein the added information includes a decision instruction for deciding whether the particular information has been set to the printer, and a print/non-print instruction for allowing the print output instruction to be executed if the particular information has been set to the printer, and for causing the print output instruction to be replaced with a print disabling instruction and then executing the print disabling instruction if the particular information has not been set to the printer;

a decision unit configured to execute the decision instruction for deciding whether the print information transmitted from the host device includes the particular information; and a print processing unit that executes printing of the print information;

wherein if the decision unit decides during execution of the print information that the print information includes the particular information, the print processing unit executes the print/non-print instruction, thereby enabling printing of the print information; and wherein if the decision unit decides during execution of the print information that the print information does not include the particular information, the print processing unit executes the print/non-print instruction, thereby disabling printing of the print information.

5. The printer of claim 4, wherein the print disabling instruction is an information deletion instruction.

6. The printer of claim 4, wherein the print disabling instruction is an undefined processing execution instruction.

* * * * *